United States Patent [19]

Eisenberg et al.

[11] 4,400,129
[45] Aug. 23, 1983

[54] WHEELCHAIR CARRIER AND LOADING DEVICE

[76] Inventors: Jack Eisenberg, 4436 San Gabriel, Dallas, Tex. 75229; Verlan D. Monaghen, 5817 Enchanted La., Dallas, Tex. 75227

[21] Appl. No.: 276,946

[22] Filed: Jun. 24, 1981

[51] Int. Cl.³ .............................................. B60R 9/06
[52] U.S. Cl. ............................ 414/462; 224/42.03 B; 224/42.03 R; 224/42.44; 414/921
[58] Field of Search ............... 414/462, 546, 548, 680, 414/921, 466, 469, 470, 555; 224/42.03 A, 42.03 B, 42.03 R, 42.07, 42.08, 42.44, 42.21

[56] References Cited

U.S. PATENT DOCUMENTS

| | | | |
|---|---|---|---|
| 2,802,612 | 8/1957 | Barcafer | 224/42.08 |
| 3,115,978 | 12/1963 | Anderson et al. | 214/450 |
| 3,357,578 | 12/1967 | Koenig | 414/462 |
| 3,448,904 | 6/1969 | Sahr | 414/466 X |
| 3,610,658 | 10/1971 | Sartori | 414/466 X |
| 3,746,194 | 7/1973 | Koenig | 414/546 X |
| 3,796,333 | 3/1974 | Goldstein | 224/42.03 B X |
| 3,800,967 | 4/1974 | Kosecoff | 214/450 |
| 3,841,544 | 10/1974 | Berger | 224/42.03 B |
| 3,937,376 | 2/1976 | Ewing | 224/42.08 |
| 4,089,448 | 5/1978 | Traeger | 224/42.03 B |
| 4,091,946 | 5/1978 | Kraeft et al. | 414/555 X |
| 4,125,214 | 11/1978 | Penn | 224/42.08 |
| 4,155,472 | 5/1979 | Dansbury | 414/466 |
| 4,213,729 | 7/1980 | Cowles et al. | 414/462 |
| 4,234,284 | 11/1980 | Hauff | 224/42.08 X |
| 4,249,683 | 2/1981 | Park | 414/466 X |
| 4,297,069 | 10/1981 | Worthington | 414/921 X |

FOREIGN PATENT DOCUMENTS

| | | | |
|---|---|---|---|
| 2807567 | 8/1978 | Fed. Rep. of Germany | 414/462 |
| 2437323 | 5/1980 | France | 224/42.03 B |

*Primary Examiner*—Leslie J. Paperner
*Assistant Examiner*—Janice Krizek
*Attorney, Agent, or Firm*—Richards, Harris & Medlock

[57] ABSTRACT

A carrier (10) for external attachment to a vehicle (80) for facilitating the loading and carrying of objects (90) externally of the vehicle (80) is provided. The carrier (10) includes a support member (26) attached externally of the vehicle (80) and extends from the vehicle (80) in a first direction. A pivot member (20) is pivotally mounted to the support member (26) and is rotatable for arcuate movement through an arc about an axis (22) extending through the pivot member (20) in a second direction. The arc of rotation is between a vertical carrying position and a receiving position at the end of the arc. A carrying device (66, 70, 72) is attached to the pivot member (20) for carrying objects (90), such that the carrying device (72, 70) receives objects (94) in the pivot member receiving position thereby loading the objects (90) to the carrier (10) for carrying the objects (90) in the pivot member vertical carrying position.

24 Claims, 4 Drawing Figures

WHEELCHAIR CARRIER AND LOADING DEVICE

TECHNICAL FIELD

This invention relates to article carrying devices, and, more particularly, to carriers for wheelchairs capable of being removably installed on vehicles, and loading devices for facilitating the carrying of wheelchairs by vehicles.

BACKGROUND ART

Vehicles, such as automobiles, are generally designed in structure to carry objects and people inside the vehicle structure. Objects can be carried in either the passenger compartment or in the baggage section or trunk of the automobile. Additionally, automobiles frequently carry objects externally to the trunk or passenger compartment areas, such as objects which are either too large or are not appropriately structured for being carried in the passenger compartment or trunk.

Numerous type vehicle attachments for the roof top, side, front or rear end both permanently or semipermanently affixed to the vehicle have been prposed. The structure, alignment and positioning of these carriers have generally been dictated by the exact type of object that the carrier is designed to accommodate. For example, roof top carriers have been designed and structured to carry relatively light objects, such as luggage, boxes and the like which can be fitted easily on the roof top. Carriers structured for the use on the rear of the vehicle are used for many purposes, such as, for example, bicycles, small vehicles, light motorcycles, and similarly irregularly structured objects which do not lend themselves readily to being carried on a vehicle roof or other areas because of their cumbersome shape or weight characteristics.

The transportation of wheelchairs when not in use presents a difficult problem because of their bulky weight and unusual shape. Typically, in order to transport a wheelchair by way of an automobile, it must be ordinarily loaded into the back seat area of the vehicle which is tedious, awkward and time consuming. Additionally, the wheelchair consumes considerable space that could otherwise be used for additional occupants of the automobile. Additionally, there is considerable risk of damage to the upholstery of the interior of the vehicle. Therefore, several wheelchair carriers have been designed for attachment to the rear of an automobile. Such wheelchair carriers are described in U.S. Pat. No. 4,213,729 issued to Cowles et al on July 22, 1980 and entitled "Vehicle Attached Carrier Pivotable About Plural Axes"; U.S. Pat. No. 3,937,376 issued to Ewing on Feb. 10, 1976 and entitled "Vehicle Support for Wheeled Vehicles" and U.S. Pat. No. 3,800,967 issued to Kosecoff on Apr. 2, 1974 and entitled "Wheelchair Carrier Attachable to Vehicle". Such proposed carriers have been structurally configured to accommodate a wheelchair for attachment to the rear of a vehicle; however, these carriers have not provided the wheelchair user or other person providing care for the wheelchair user with an efficient and easy method of loading and unloading the wheelchair to the carrier. Furthermore, such previously developed wheelchair carriers have prevented access to the trunk interior of an automobile and to the gas tank, if rearwardly located, whether the wheelchair is affixed to the carrier or not.

An additional problem associated with wheelchair carriers is that they are not easily attachable to an automobile by persons lacking in mechanical skills. Since a wheelchair user may be the individual desiring to carry the wheelchair utilizing his automobile, a necessity for a carrier that is easily attachable without assistance from others and which can be attached to the automobile in minimal time is readily apparent. Furthermore, the loading of the wheelchair to the carrier must be achievable by a person of minimal or limited strength which presents a problem because of the cumbersome structure and weight of wheelchairs.

A need has thus arisen for a wheelchair carrier and loading device which is easily attached to a vehicle by a wheelchair user or another individual without assistance from others and in a minimal amount of time. Furthermore, a need has arisen for a wheelchair carrier that will facilitate the lifting of the wheelchair onto the carrier with minimal effort and which does not interfere with the use of trunk space or the gas tank when a wheelchair is being carried by the carrier device.

DISCLOSURE OF THE INVENTION

In accordance with the present invention, a wheelchair carrier and loading device is provided that is relatively inexpensive, simple and durable in construction, capable of being removably installed on a vehicle and wherein a collapsed wheelchair can be easily manipulated onto and withdrawn from the carrier by a single person, and wherein the carrier does not interfere with the use of the trunk of a vehicle or access to the gas tank.

In accordance with another aspect of the present invention, a carrier for external attachment to a vehicle for facilitating the loading and carrying of objects externally of the vehicle includes a fixed support member attached externally of the vehicle and which extends from the vehicle in a first direction. A pivot member is pivotally mounted to the fixed support member and is rotatable for arcuate movement through an arc about an axis extending through the pivot member in a second direction. The arc of rotation is between a vertical carrying position and a receiving position at the end of the arc and wherein the second direction is perpendicular to the first direction. A carrying device is attached to the pivot member for carrying objects, such that the carrying member receives objects in the pivot member receive position thereby loading the object to the carrier for carrying the object in the pivot member vertical carrying position.

In accordance with another aspect of the present invention, a carrier for external attachment to a vehicle for facilitating the loading and carrying external of the vehicle of a wheelchair is provided. A fixed support member is attached externally of the vehicle and extends from the vehicle in a first direction. A pivot member is pivotally mounted to the fixed support member and rotatable for arcuate movement through an arc about an axis extending through the pivot member in a second direction. The arc of rotation is between a vertical carrying position and a receiving position at the end of the arc and wherein the second direction is perpendicular to the first direction. A carrying device is attached to the pivot member for carrying the wheelchair, such that the carrying device receives the arms of the wheelchair in the pivot member receive position and frictionally engages the arms of the wheelchair thereby lifting the wheelchair for carrying the wheelchair in the pivot member vertical carrying position.

In accordance with yet another aspect of the present invention, a wheelchair carrier for external attachment to a vehicle for carrying wheelchairs externally of the vehicle and wherein the vehicle has a central longitudinal axis extending from the front to the back of the vehicle is provided. A fixed support member is attached externally of the vehicle and extends rearwardly from the vehicle. A pivot member is pivotally mounted to the fixed support member and is rotatable for arcuate movement through an arc about an axis extending through the pivot member. The arc of rotation is between a pivot member vertical carrying position and a receiving position rearward of the vehicle at the end of the arc and wherein the axis is perpendicular to the central longitudinal axis of the vehicle. A support device is interconnected to the pivot member and extends rearwardly of the vehicle for receiving the arms of the wheelchair. A clamp is interconnected to the pivot member and is disposed adjacent the support device for frictionally engaging at least one arm of the wheelchair. At least one arm of the wheelchair is mounted between the clamp and the support device in the pivot member vertical carrying position. The support device in the pivot member receiving position is positionable to be placed under the arms of the wheelchair, such that as the pivot member rotates to the pivot member vertical position, at least one of the arms of the wheelchair slidably engages the clamp to thereby load the wheelchair to the wheelchair carrier with minimal effort by the user.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
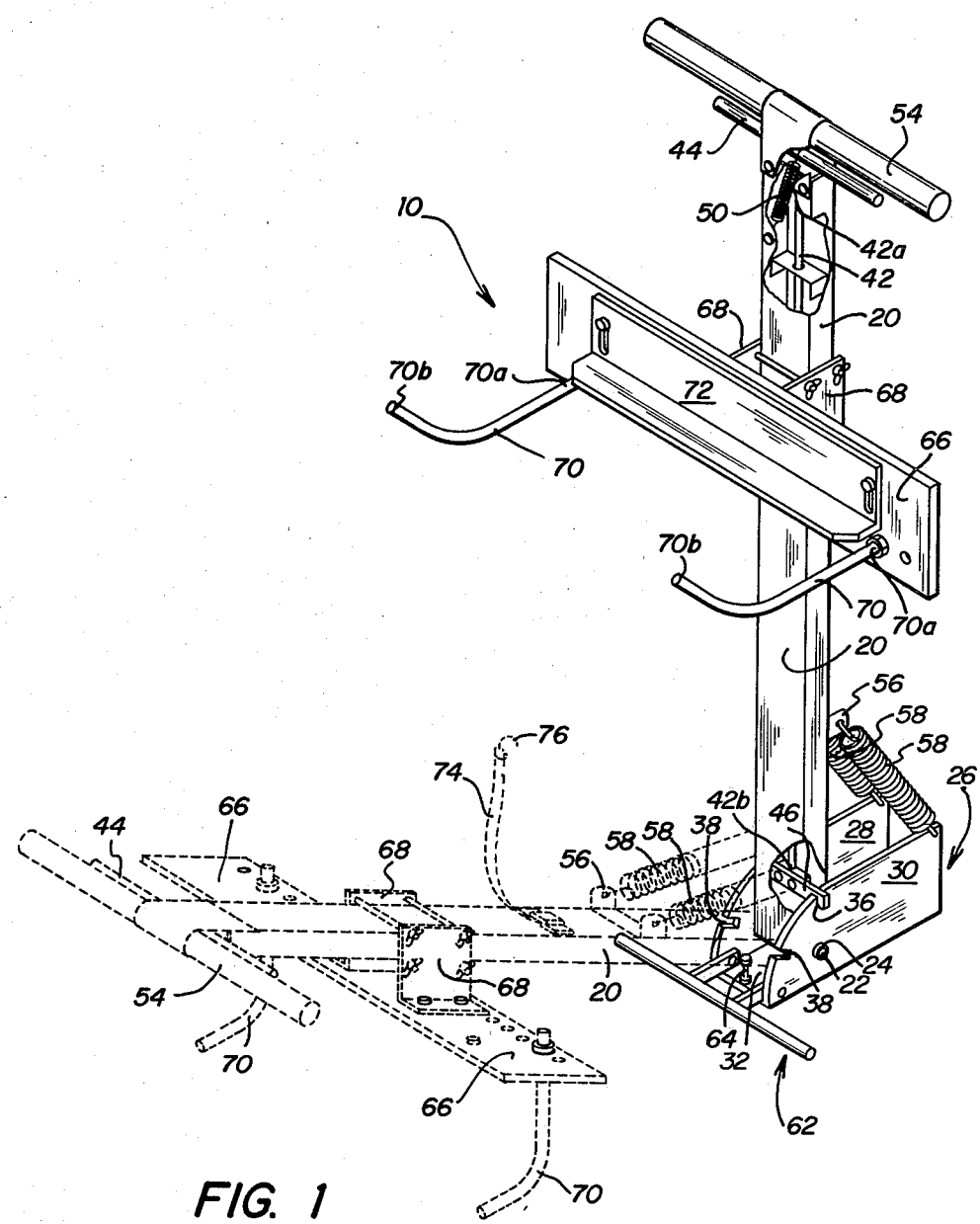
FIG. 1 is a perspective view illustrating the carrier of the present invention in the carrying position and receiving position.

Referring to FIG. 1, a preferred embodiment of the present wheelchair carrier assembly, generally identified by the numeral 10 for attachment to the rear bumper of an automobile is shown. Carrier assembly 10 specifically described herein and shown in the Drawings is particularly adapted to carrying a wheelchair as illustrated. However, the principles and physical characteristics of the present invention, with minor variations, are applicable to carrying various other types of objects. What can be carried by the present carrier assembly 10 is limited only by objects of extreme weight or size. The invention can also be used on the front or side of an automobile or other vehicle. For the purpose of delineating a specific embodiment and the application thereof, a wheelchair carrier assembly 10 is described herein.

Wheelchair carrier assembly 10 includes a pivot member 20 interconnected through a rotating shaft 22 which is journaled in a bushing 24 located in a support bracket generally identified by the numeral 26. Support bracket 26 includes side walls 28 and 30. Side walls 28 and 30 are interconnected by a bottom wall 32. Shaft 22 traverses side walls 28 and 30 and lies in a plane parallel to bottom wall 32 of support bracket 26. Shaft 22 permits pivot member 20 to arcuately rotate through an arc about shaft 22 between a vertical carrying position, illustrated in FIG. 1 in the solid lines, and a receiving position at the end of the arc of rotation illustrated in FIG. 1 in the dotted lines. As used herein, the receiving position is defined as including both the positions in which a wheelchair may be loaded and unloaded from carrier assembly 10.

Disposed within each side walls 28 and 30 of support bracket 26 are detents 36 and 38. Positioned within pivot member 20 is a shaft 42 extending the length of pivot member 20 and having ends 42a and 42b. Interconnected to end 42a of shaft 42 is a lever 44 which extends transversely through pivot member 20 parallel to rotating shaft 22. Interconnected to end 42b of shaft 42 is a pin 46 for engaging detents 36 and 38 of support bracket 26. Shaft 42 is biased to pivot member 20 utilizing a spring 50 which is interconnected between lever 44 and pivot member 20.

In the vertical position as illustrated in FIG. 1 in the solid lines, pin 46 engages detents 36 within side walls 28 and 30 of support bracket 26, such that pivot member 20 is locked in the vertical carrying position. By raising lever 44 thereby compressing spring 50, pin 46 disengages detents 36 and is raised to a position above side walls 28 and 30 of support bracket 26 to enable pivot member 20 to rotate through an arc from the vertical position to the receiving position. In the receiving position, pin 46 engages detents 38 within side walls 28 and 30 of support bracket 26 to lock pivot member 20 in the receiving position. It therefore can be seen that through operation of lever 44, pin 46 and detents 36 and 38, pivot member 20 can be locked in the vertical carrying position or receiving position.

Carrier assembly 10 further includes a handle 54 extending through the upper end of pivot member 20 for manipulating pivot member 20 through the arc of rotation between the positions illustrated in FIG. 1.

Interconnected to pivot member 20 is a bracket 56 for mounting a pair of springs 58 between pivot member 20 and side walls 28 and 30 of support bracket 26. Springs 58 provide a controlled bias on pivot member 20 to prevent pivot member 20 from excessive rotation from the receiving position to the vertical carrying position when carrier assembly 10 is empty.

Interconnected to side walls 28 and 30 of support bracket 26 is a bumper assembly generally identified by the numeral 62 which is disposed parallel to shaft 22. Bumper assembly 62 engages the wheels of a wheelchair carried by carrier assembly 10 to maintain the wheelchair in a vertical position and to prevent the wheelchair from interfering with rotation of pivot member 20 as will subsequently be described with respect to FIG. 3. Disposed within bottom wall 32 of support bracket 26 is a stop member 64 for restricting movement of pivot member 20 past the receiving position.

Interconnected to pivot member 20 is a support plate 66. Support plate 66 extends perpendicularly to pivot member 20 and is interconnected to pivot member 20 using brackets 68. Interconnected to support plate 66 are a pair of support forks 70 each having ends 70a and 70b. Ends 70a extend perpendicularly from support plate 66 and arcuately curve upwardly to ends 70b. Disposed above support forks 70 and interconnected to support plate 66 is a clamp 72. Clamp 72 functions to frictionally engage an arm of the wheelchair carried by carrier assembly 10 between clamp 72 and support forks 70 as will subsequently be described. Clamp 72, support forks 70 as well as support plate 66 are all adjustable to accommodate various sized wheelchairs carried by carrier assembly 10 as will be discussed with respect to FIG. 4.

Also illustrated in FIG. 1 is a strap 74. Strap 74 has one end thereof interconnected to pivot member 20. The free end of strap 74 includes a hook 76 for attachment to the wheelchair for preventing movement of the lower portion of a wheelchair during transit using the present carrier assembly 10. Strap 74 also permits a wheelchair to be mounted to pivot member 20, such that pivot member 20 can be rotated between the vertical carrying position and receiving position while the wheelchair is attached to pivot member 20 thereby permitting access to the rear of an automobile without removal of the wheelchair.

Figure 2:
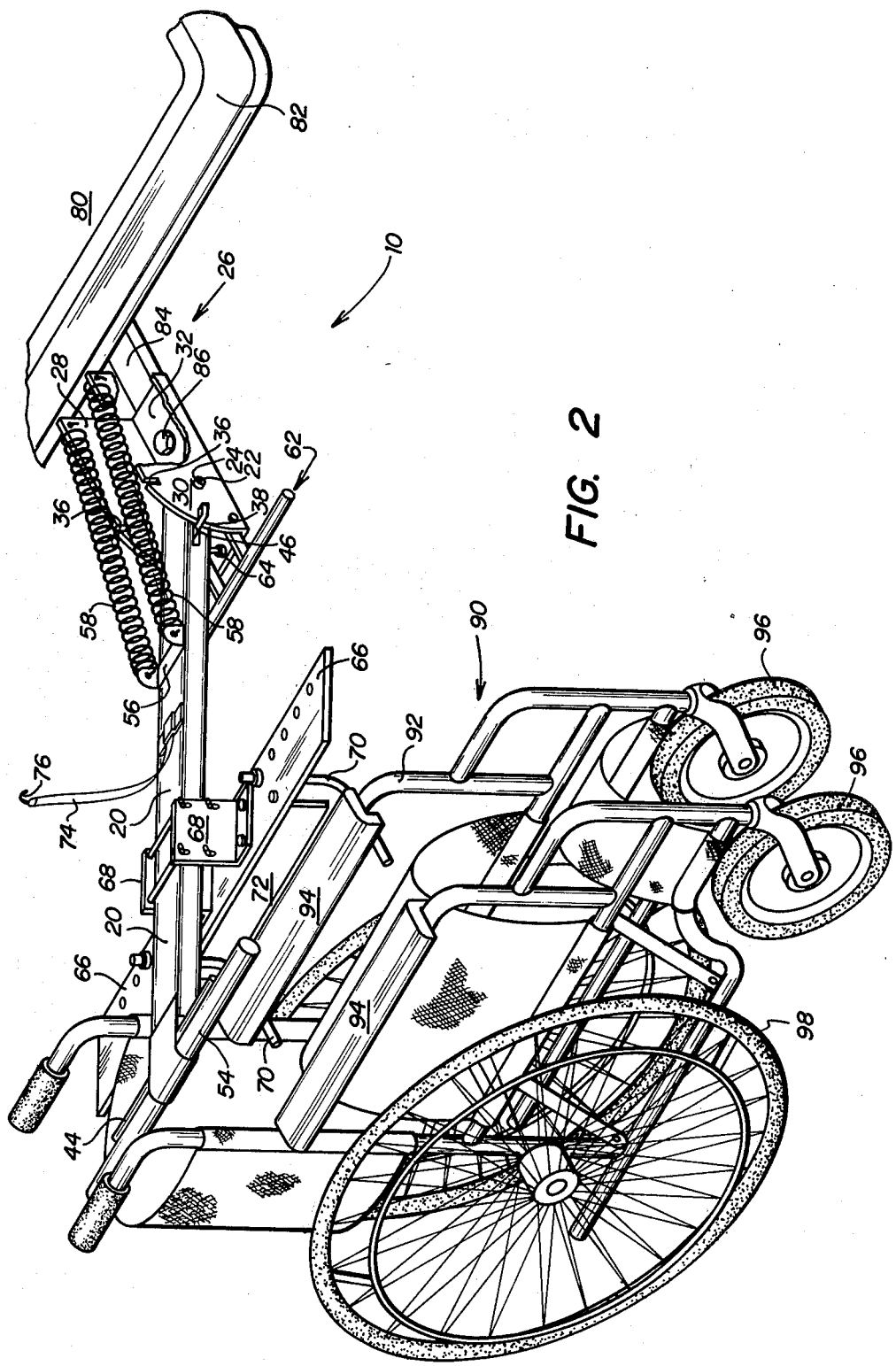
FIG. 2 is a perspective view of the present carrier attached to the rear bumper of an automobile in the receiving position for loading of a wheelchair.

Referring now to FIG. 2, wherein like numerals are utilized for like and corresponding components previously identified, the rear end of an automobile 80 having a bumper 82 is illustrated. Interconnected to bumper 82 is a standard trailer-hitch type mounting bracket 84 for use in detachably connecting support bracket 26 of carrier assembly 10 to automobile 80. a bolt 86 extends through bottom wall 32 of support bracket 26 for interconnection to bracket 84. An important aspect of the present invention is the operation of carrier assembly 10 to permit access to the rear of an automobile 80 either to the trunk compartment or gas tank. Due to the rotatable nature of pivot member 20, rotating rearwardly from automobile 80, the user has access to the trunk compartment and gas tank even though carrier assembly 10 is carrying a wheelchair.

FIG. 2 further illustrates a wheelchair, generally identified by the numeral 90. Wheelchair 90 is of typical construction including support structure 92, arms 94, front wheels 96 and larger rear wheels 98. Wheelchair 90 is shown in a conventional folded position for being mounted to carrier assembly 10 in the receiving position. It can be seen from FIG. 2 that pivot member 20 has rotated such that pin 46 is engaged in detents 38 of support bracket 26, such that support forks 70 are disposed beneath arms 94 of wheelchair 90. Wheelchair 90 is slightly tilted towards the rear of automobile 80 such that arcuate ends 70b of support forks 70 are slid under arms 94 of wheelchair 90 in the loading position. It therefore can be seen that wheelchair 90 need not be lifted off the ground in order to position wheelchair 90 for loading to carrier assembly 10, and therefore carrier assembly 10 can be utilized by persons having strengths less than that required to lift wheelchair 90.

Figure 3:
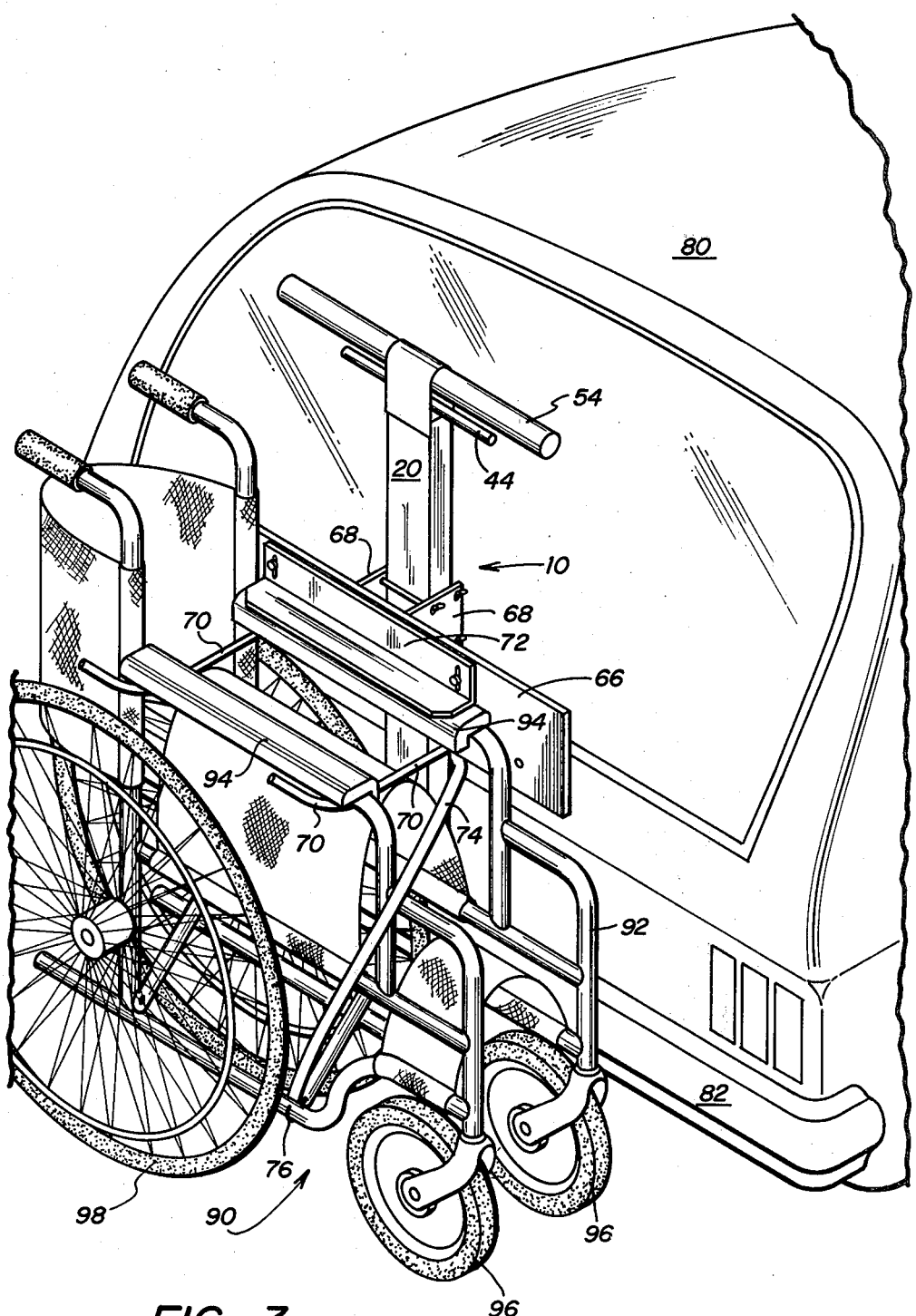
FIG. 3 is a perspective view of the carrier of the present invention attached to the rear bumper of an automobile in the carrying position with a loaded wheelchair.

Referring simultaneously to FIGS. 2 and 3, to complete the loading of wheelchair 90 to carrier assembly 10, lever 44 is lifted upwardly towards handle 54, such that pin 46 disengages detents 38 of support bracket 26. Pivot member 20 is then rotated from the position illustrated in FIG. 2 to the vertical carrying position of carrier assembly 10 illustrated in FIG. 3. Wheelchair 90 is now mounted to carrier assembly 10 for transportation by automobile 80.

FIG. 3 illustrates one arm 94 of wheelchair 90 frictionally engaged and held between clamp 72 and support forks 70. The rotational motion of pivot member 20 from the receiving position (FIG. 2) to the vertical carrying position (FIG. 3) of carrier assembly 10 causes arms 94 to slide over support forks 70, such that one arm 94 becomes frictionally engaged between clamp 72 and support forks 70 to thereby completely support the weight of wheelchair 90.

As previously discussed, bumper assembly 62 is disposed to contact wheels 96 and 98 on one side of wheelchair 90 and functions as a bumper to maintain wheelchair 90 in a vertical position parallel to pivot member 20 in the vertical carrying position as well as preventing wheelchair 90 from interfering with the rotation of pivot member 20, particularly the structure comprising pin 46 and support bracket 26.

The reverse procedure as described with respect to FIGS. 2 and 3 is followed for unloading wheelchair 90 from carrier assembly 10. Pivot member 20 is rotated from the vertical carrying position as illustrated in FIG. 3 through an arc of rotation to the receiving position as illustrated in FIG. 2, such that arms 94 of wheelchair 90 frictionally slide from ends 70a of support fork 70 to ends 70b to permit wheelchair 90 to be tilted from carrier assembly 10 and thereby unloaded.

FIG. 3 further illustrates operation of strap 74 wherein hook 76 is attached to support structure 92 of wheelchair 90.

Figure 4:
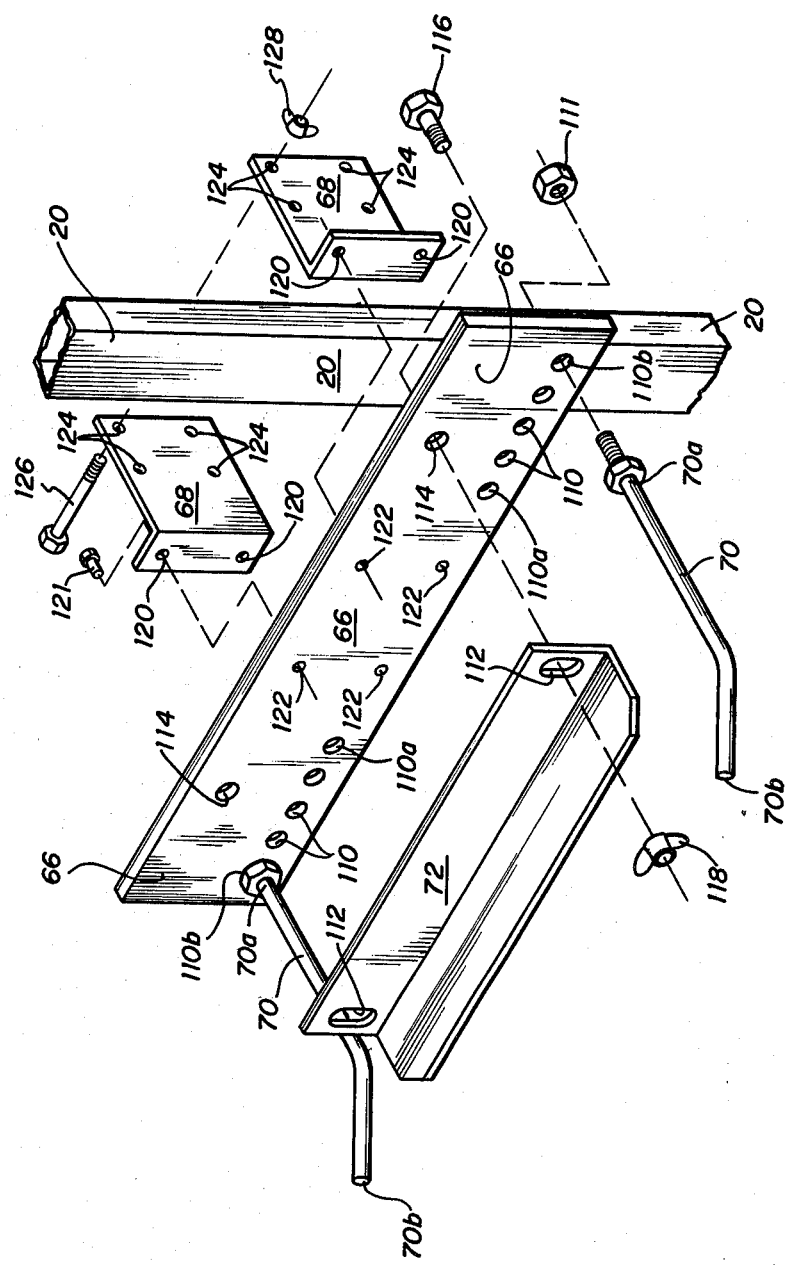
FIG. 4 is an exploded perspective view of the wheelchair support structure of the present invention illustrating the adjustable aspects of the present carrier.

Referring now to FIG. 4, the adjustable nature of carrier assembly 10 will now be discussed. Support plate 66 includes a plurality of apertures 110 for receiving threaded ends 70a of support forks 70 which are mounted to support plate 66 using bolts 111. A plurality of apertures 110 is provided in support plate 66 to accommodate wheelchair arms 94 of varying lengths. It therefore can be seen that if a wheelchair arm is short, apertures 110a will receive support forks 70, whereas if a wheelchair arm 94 is long, apertures 110b will be utilized for supporting support forks 70 to thereby distribute the weight of wheelchair 90 over a greater area.

A further adjustable feature of the present carrier assembly 10 is provided to accommodate wheelchair arms 94 of varying thicknesses. Clamp 72 includes slotted apertures 112 which mate with apertures 114 contained within support plate 66 to be joined by bolt 116 and nut 118. Slotted apertures 112 permit vertical adjustment of clamp 72 with respect to support plate 66 to thereby accommodate various sized thicknesses of wheelchair arms 94. For wheelchair arms 94 of thin thicknesses, clamp 72 will be mounted to support plate 66 such that the top ends of slotted aperture 112 receive bolts for mounting clamp 72 to support plate 66, whereas if arms 94 of wheelchair 90 were thick, the bottom ends of slotted apertures 112 of clamp 72 would receive bolts for mounting clamp 72 to support plate 66.

A still further adjustable feature of the present carrier assembly 10 is provided by brackets 68. Brackets 68 include apertures 120 for receiving bolts 121 to be interconnected to apertures 122 within support plate 66. Disposed between brackets 68 is pivot member 20. Brackets 68 are slidable along pivot member 20 to accommodate wheelchair 90 being of varying heights, such that support forks 70 can engage arms 94 that are a range of heights above the ground. Brackets 68 include apertures 124 for receiving bolts 126 and nut 128 for mounting support plate 66 to pivot member 20 at desired positions along pivot member 20 between handle 54 and bracket 56.

It therefore can be seen that the present carrier assembly 10 for facilitating the loading and carrying of a wheelchair 90 to the rear of a vehicle such as automobile 80 is operable to load and carry a wheelchair with a minimal amount of effort. Wheelchair 90 or other objects to be carried by carrier assembly 10 need not be lifted off the ground to be loaded to carrier assembly 10 which thereby permits the wheelchair user to operate carrier assembly 10 himself. Furthermore, the present carrier assembly 10 permits relatively unobstructed access to the trunk storage compartment and gas tank of a vehicle. Therefore, access can be had to these areas of an automobile whether or not a wheelchair is mounted to the present carrier assembly. Furthermore, the present carrier assembly 10 can be mounted to an existing ball of a trailer-hitch or bolted to a bracket interconnected to the bumper of the rear of an automobile.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A carrier for external attachment to a vehicle for facilitating the loading and carrying of a wheelchair externally of the vehicle comprising:
    a fixed support member attached externally of the vehicle and extending from the vehicle in a first direction;
    a pivot member being pivotally mounted to said fixed support member and rotatable for arcuate movement through an arc about an axis extending through said pivot member in a second direction, said arc of of rotation being between a vertical carrying position and a receiving position at the end of the arc and wherein said second direction is perpendicular to said first direction;
    carrying means attached to said pivot member for carrying a wheelchair such that said carrying means receives a wheelchair in said pivot member receiving position without the necessity to lift the wheelchair onto the carrying means, the pivot member subsequently being pivoted to the vertical carrying position to thereby load the wheelchair to the carrier for carrying the wheelchair in said pivot member vertical carrying position; and
    means for locking said pivot member to said fixed support member in said vertical carrying position and said receiving position, said means for locking including:
        at least one pin mounted on said pivot member for movement between locking and release positions, the fixed support member having at least one first locking detent to receive the pin to lock the pivot member in the receiving position and at least one second locking detent to receive the pin to lock the pivot member in the vertical carrying position;
        spring means for urging said pin into said first and second locking detents; and
        a lever for moving the pin to the release position against the force of said spring means to permit pivotal motion between the fixed support member and pivot member.

2. The carrier of claim 1 wherein said carrying means includes:
    support means extending in said first direction interconnected to said pivot member for supporting the wheelchair; and
    clamp means for receiving a portion of the wheelchair above said support means for frictionally engaging a portion of the wheelchair between said clamp means and said support means to thereby carry the wheelchair in said pivot member vertical carrying position.

3. The carrier of claim 1 and further including:
    bracket means for attaching said fixed support member to the vehicle.

4. A carrier for external attachment to a vehicle for facilitating the loading by an individual of a wheelchair having wheels and arms from the ground onto the vehicle for carrying the wheelchair external of a vehicle comprising:
    a fixed support member attached externally of the vehicle and extending from the vehicle in a first direction;
    a pivot member being pivotally mounted to said fixed support member and rotatable for arcuate movement through an arc about an axis extending through said pivot member in a second direction, said arc of rotation being between a vertical carrying position and a receiving position at the end of the arc and wherein said second direction is perpendicular to said first direction;
    carrying means attached to said pivot member for carrying the wheelchair, such that said carrying means receives the arms of the wheelchair in said pivot member receiving position to frictionally engage the arms of the wheelchair as the wheelchair rests on the ground, movement of the pivot member to the vertical carrying position lifting the wheelchair off the ground for carrying the wheelchair in said pivot member vertical carrying position; and
    a locking assembly for positively locking the pivot member in said pivot member vertical carrying position and said receiving position, including:
        at least one locking pin mounted on said pivot member for movement between locking and release positions, the fixed support member having at least one first locking detent to receive the pin to lock the pivot member in the receiving position and at least one second locking detent to receive the pin to lock the pivot member in the vertical carrying position;
        spring means for urging said pin into said first and second locking detents; and
        a lever operatively connected to said pin for moving the pin between the release and locking positions against the force of said spring means to permit the individual to move the pin to the release position to pivot the pivot member between the vertical carrying position and receiving position.

5. The carrier of claim 4 wherein said carrying means includes:
    support means connected to said pivot member for supporting the arms of the wheelchair.

6. The carrier of claim 5 wherein said carrying means further includes:
    clamp means for receiving at least one arm of the wheelchair above said support means for frictionally engaging at least one arm of the wheelchair between said clamp means and said support means.

7. The carrier of claim 6 wherein said clamp means is adjustable on said carrying means to vary the distance between said clamp means and said support means for receiving the wheelchair arms of varying thicknesses, and wherein said support means is adjustable on said carrying means for receiving wheelchair arms of varying lengths.

8. The carrier of claim 5 wherein said support means includes a support plate clamped to said pivot member so that said support plate can be moved along the length of said pivot member to vary the distance between said support means and said fixed support member for carrying wheelchairs of varying heights, said support means including at least two support forks secured to said support plate for extending under at least one arm of the wheelchair to lift and support the wheelchair, the support plate having a plurality of positions for securing the support forks on the support plate for receiving wheelchair arms of varying lengths, said carrier further comprising a clamp mounted on said support plate to clamp the arm of the wheelchair between the clamp and suppport forks, the clamp having slotted apertures permitting adjustment of the distance between the clamp and support forks for receiving wheelchair arms of varying thicknesses.

9. The carrier of claim 4 wherein said carrying means is slidably adjustable on said pivot member to vary the distance between said carrying means and said fixed support member for carrying wheelchairs of varying heights.

10. The carrier of claim 4 and further including:
means for maintaining the wheels of the wheelchair in a spaced apart relationship from said pivot member in said pivot member vertical carrying position.

11. The carrier of claim 4 wherein said fixed support member includes bracket means for attachment to the bumper of a vehicle.

12. The carrier of claim 11 wherein said bracket means comprises trailer-hitch means.

13. A wheelchair carrier for external attachment to a vehicle for lifting from the ground and carrying wheelchairs having wheels and arms externally of the vehicle, the carrier being operated by an individual, and wherein the vehicle has a central longitudinal axis extending from the front to the back of a vehicle comprising:
a fixed support member attached externally of the vehicle and having two side walls extending rearwardly from the vehicle, each of said side walls having first and second detents formed therein;
a pivot member being pivotally mounted to said fixed support member between said two side walls and rotatable for arcuate movement through an arc about an axis extending through said pivot member, said arc of rotation being between a pivot member vertical carrying position and a receiving position rearward of the vehicle at the end of the arc and wherein said axis is perpendicular to the central longitudinal axis of the vehicle, said pivot member having a handle thereon spaced from the pivotal mount for the individual to pivot the pivot member;
support means interconnected to said pivot member and extending rearwardly of the vehicle for receiving the arms of the wheelchair as it rests on the ground with the pivot member in the receiving position, the wheelchair carrier lifting the wheelchair off the ground as the pivot member pivots to the vertical carrying position;
clamp means interconnected to said pivot member and disposed adjacent said support means for frictionally engaging at least one arm of the wheelchair, such that at least one arm of the wheelchair is maintained between said clamp means and said support means in said pivot member vertical carrying position;
said support means in said pivot member receiving position being positionable to be placed under the arms of the wheelchair, such that as said pivot member rotates to said pivot member vertical carrying position, at least one of the arms of the wheelchair slidably engages said clamp means thereby loading the wheelchair to the wheelchair carrier with minimal effort by the user; and
a locking assembly for positively locking the pivot member to the fixed support member in the carrying and receiving positions, including:
a shaft mounted on said pivot member for limited motion along its length;
two pins mounted at one end of said shaft, each pin adjacent one of the side walls of the fixed support member;
a spring interconnected between said pivot member and said shaft to urge the shaft and pins toward the fixed support member so that the pins enter the first detents in the side walls of the fixed support member to positively lock the pivot member in the receiving position and the pins enter the second detents in the side walls of the fixed support member in the vertical carrying position to lock the pivot member in the carrying position; and
a lever connected to the end of the shaft opposite the pins and proximate the handle on the pivot member so that the individual operating the wheelchair carrier can grasp the lever as he grasps the handle to move the shaft and pins from the detents for pivoting the pivot arm member between the receiving and vertical carrying positions.

14. The carrier of claim 13 wherein said support means includes:
first and second support forks, each having first and second ends, said first end being interconnected to said pivot member and said second end being arcuately shaped for receiving the arms of the wheelchair.

15. The carrier of claim 14 wherein said first and second support forks are adjustable on said support means to vary the distance between said first and second support forks to accommodate wheelchair arms of varying lengths.

16. The carrier of claim 14 wherein said clamp means is adjustable on said pivot member to vary the distance between said clamp means and said first and second support forks to accommodate wheelchair arms of varying thicknesses.

17. The carrier of claim 13 wherein said clamp means and said support means are slidably adjustable on said pivot member to vary the distance between said clamp means and said fixed support member for carrying wheelchairs of varying heights.

18. The carrier of claim 1 and further including:
a least one spring secured between said fixed support member and pivot member to urge the pivot member into the vertical carrying position so that the weight of the wheelchair received on the carrying means is generally compensated for by the spring force to minimize the efforts of the individual necessary to move the pivot member and wheelchair between the receiving position and the vertical carrying position.

19. The carrier of claim 1 wherein said carrying means includes:
   a support plate clamped to said pivot member so that said support plate can be moved along the length of said pivot member;
   at least two support forks secured to said support plate for extending under an arm of the wheelchair to lift and support the wheelchair, the support plate having a plurality of positions for securing the support forks to adjust the carrying means for various wheelchair arm lengths;
   a clamp mounted on said support plate to clamp the arm of the wheelchair between the clamp and support forks, the clamp having slotted apertures permitting adjustment of the distance between the clamp and support forks to adjust the carrying means for various wheelchair arm thicknesses.

20. The carrier of claim 1 wherein said pivot member includes a handle mounted thereon opposite the pivotal mounting to the fixed support member to facilitate pivotal movement of the pivot member by the individual, said means for locking further having a shaft extending along the pivot member and operably interconnecting the lever and pin so that the lever is proximate the handle, permitting an individual to grasp the handle and lever simultaneously to unlock and pivot the pivot member.

21. The carrier of claim 4 and further including:
   at least one spring secured between said fixed support member and pivot member to urge the pivot member into the vertical carrying position so that the weight of the wheelchair received on the carrying means is generally compensated for by the spring force to minimize the effort of the individual necessary to move the pivot member and wheelchair between the receiving position and the vertical carrying position.

22. The carrier of claim 4 wherein said pivot member includes a handle mounted thereon opposite the pivotal mounting to the fixed support member to facilitate pivotal movement of the pivot member by the individual, said means for locking further having a shaft extending along the pivot member and operably interconnecting the lever and pin so that the lever is proximate the handle, permitting the individual to grasp the handle and lever simultaneously to unlock and pivot the pivot member.

23. The carrier of claim 13 and further including:
   at least one spring secured between said fixed support member and pivot member to urge the pivot member into the vertical carrying position so that the weight of the wheelchair received on the carrying means is generally compensated for by the spring force to minimize the effort of the individual necessary to move the pivot member and wheelchair between the receiving position and the vertical carrying position.

24. The carrier of claim 13 wherein said support means includes:
   a support plate clamped to said pivot member so that said support plate can be moved along the length of said pivot member to adjust the carrier for various wheelchair heights; and
   at least two support forks secured to said support plate for extending under an arm of the wheelchair to lift and support the wheelchair, the support plate having a plurality of positions for securing the support forks to adjust the carrying means for various wheelchair arm lengths;
   said clamp means including a clamp mounted on said support plate to clamp the arm of the wheelchair between the clamp and support forks, the clamp having slotted apertures permitting adjustment of the distance between the clamp and support forks to adjust the clamping means for various wheelchair arm thicknesses.

* * * * *